US008936402B2

(12) United States Patent
McColloch

(10) Patent No.: US 8,936,402 B2
(45) Date of Patent: Jan. 20, 2015

(54) METHOD AND APPARATUS FOR MOUNTING AND POSITIONING PARALLEL OPTICAL TRANSCEIVER MODULES IN A MID-PLANE MOUNTING CONFIGURATION WITH IMPROVED MOUNTING DENSITY AND ALIGNMENT ACCURACY

(75) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1167 days.

(21) Appl. No.: 12/711,093

(22) Filed: Feb. 23, 2010

(65) Prior Publication Data

US 2011/0206326 A1 Aug. 25, 2011

(51) Int. Cl.
*G02B 6/36* (2006.01)
*G02B 6/43* (2006.01)
*G02B 6/42* (2006.01)

(52) U.S. Cl.
CPC ................ *G02B 6/43* (2013.01); *G02B 6/4246* (2013.01); *G02B 6/4249* (2013.01)
USPC .............................................. 385/88; 385/92

(58) Field of Classification Search
USPC ...................................................... 385/88–94
See application file for complete search history.

(56) References Cited

U.S. PATENT DOCUMENTS

| | | | | |
|---|---|---|---|---|
| 6,085,007 | A * | 7/2000 | Jiang et al. | 385/92 |
| 6,416,238 | B1 | 7/2002 | Gilliland et al. | |
| 6,705,769 | B2 | 3/2004 | Brezina et al. | |
| 6,799,897 | B2 * | 10/2004 | Sherrer | 385/55 |
| 7,245,498 | B2 | 7/2007 | Togami et al. | |
| 7,455,463 | B2 * | 11/2008 | Togami et al. | 385/93 |
| 7,462,055 | B2 * | 12/2008 | Kuo et al. | 439/330 |
| 7,594,766 | B1 | 9/2009 | Sasser et al. | |
| 7,833,022 | B2 * | 11/2010 | Polnyi et al. | 439/71 |
| 7,894,691 | B2 * | 2/2011 | Ikeda et al. | 385/14 |
| 2006/0002005 | A1 * | 1/2006 | Miyazaki et al. | 360/97.01 |
| 2006/0062527 | A1 * | 3/2006 | Schrodinger | 385/89 |
| 2011/0026888 | A1 * | 2/2011 | Nekado et al. | 385/92 |
| 2011/0103797 | A1 * | 5/2011 | Oki et al. | 398/79 |

* cited by examiner

*Primary Examiner* — Tina Wong

(57) ABSTRACT

An optical communications system is provided in which module locating pins of the system mate with inwardly-shaped corners formed on parallel optical transceiver modules of the system when the parallel optical transceiver modules are mounted on a mid-plane mounting structure of the system. The inwardly-shaped corners of the parallel optical transceiver modules are complementary in shape to portions of the module locating pins. The mating of the module locating pins with the inwardly-shaped corners of the modules operates to passively position the modules at intended spatial locations relative to each other and relative to the mid-plane mounting structure. The inwardly-shaped corners consume very little space in the modules and the pins consume very little space in the optical communications system. Consequently, the pitch between adjacent parallel optical transceiver modules can be kept very small and the mounting density of the modules on the mid-plane mounting structure can be very high.

19 Claims, 8 Drawing Sheets

METHOD AND APPARATUS FOR MOUNTING AND POSITIONING PARALLEL OPTICAL TRANSCEIVER MODULES IN A MID-PLANE MOUNTING CONFIGURATION WITH IMPROVED MOUNTING DENSITY AND ALIGNMENT ACCURACY

TECHNICAL FIELD OF THE INVENTION

The invention relates to optical communications systems. More particularly, the invention relates to an optical communications system and method for high-density, mid-plane mounting of multiple parallel optical transceiver modules.

BACKGROUND OF THE INVENTION

A parallel optical communications module is a module having multiple transmit (TX) channels, multiple receive (RX) channels, or both. A parallel optical transceiver module is an optical communications module that has multiple TX channels and multiple RX channels in the TX and RX portions, respectively, of the transceiver. The TX portion comprises components for transmitting data in the form of modulated optical signals over multiple optical waveguides, which are typically optical fibers. The TX portion includes a laser driver circuit and a plurality of laser diodes. The laser driver circuit outputs electrical signals to the laser diodes to modulate them. When the laser diodes are modulated, they output optical signals that have power levels corresponding to logic 1s and logic 0s. An optics system of the transceiver module focuses the optical signals produced by the laser diodes into the ends of respective transmit optical fibers held within a connector that mates with the transceiver module.

The RX portion includes a plurality of receive photodiodes that receive incoming optical signals output from the ends of respective receive optical fibers held in the connector. The optics system of the transceiver module focuses the light that is output from the ends of the receive optical fibers onto the respective receive photodiodes. The receive photodiodes convert the incoming optical signals into electrical analog signals. An electrical detection circuit receives the electrical signals produced by the receive photodiodes and outputs corresponding amplified electrical signals, which are processed in the RX portion to recover the data.

There is an ever-increasing demand in the optical communications industry for optical communications systems that are capable of simultaneously transmitting and receiving ever-increasing amounts of data. To accomplish this, it is known to arrange multiple parallel optical transceiver modules in an array such that all of the modules simultaneously transmit and receive multiple optical data signals over multiple TX and RX channels. A variety of array configurations exist in the optical communications industry. For example, one known type of array configuration includes multiple multi-fiber connector modules known in the industry as MTP® connector modules. In the array, each MTP connector module plugs into a respective receptacle that is secured to a front panel of an optical communications system. This type of configuration is typically referred to as an edge-mounting configuration due to the fact that the modules plug into the front panel, and thus are connected on an edge of the optical communications system.

An alternative to edge-mounting configurations are mid-plane mounting configurations. A mid-plane mounting configuration is one in which multiple parallel optical transceiver modules are mounted in the plane of a motherboard printed circuit board (PCB). One known parallel optical transceiver module that is mid-plane mounted is the Snap 12 transceiver module. The Snap 12 transceiver module comprises a 12-channel TX module and a 12-channel RX module. Each module has an array of 100 input/output (I/O) module locating pins that plugs into a 100-module locating pin ball grid array (BGA), known as a Meg-array. The Meg-array is, in turn, secured to the host PCB motherboard.

Other mid-plane mounting solutions exist or have been proposed for mounting multiple parallel optical transceiver modules on a motherboard PCB. One of the problems associated with the existing or proposed mid-plane mounting solutions is that they limit the density with which the modules can be mounted on the motherboard PCB. Each module is typically mounted in a socket that has inner side walls that have flat edges that operate to position and align the modules. The sockets are typically either secured directly to the motherboard PCB or to a leadframe that is secured to the motherboard PCB. The sockets themselves consume space and therefore increase the pitch (i.e., the lateral spacing) between adjacent modules. In addition, the flat edges located on the inner side walls of the sockets also consume space and therefore also increase the pitch between adjacent modules. Both of these factors reduce the density with which the modules can be arrayed in a mid-plane mounting configuration.

A need exists for a method and an apparatus that increase mounting density and improve alignment of parallel optical transceiver modules in a mid-plane mounting configuration.

SUMMARY OF THE INVENTION

The invention is directed to an optical communications system and method. The system comprises a mid-plane mounting structure, an array of parallel optical transceiver modules, and a plurality of module locating pins. The system has a circuit board (CB) mounted on an upper surface thereof. The array of optical transceiver modules is mounted on an upper mounting surface of the CB. Each of the transceiver modules has at least one inwardly-shaped corner. Each inwardly-shaped corner has a shape that is generally complementary to a shape of a portion of a module locating pin. The module locating pins are positioned at predetermined positions in the optical communications system, and each module locating pin has a shape that is generally complementary to the shape of the inwardly-shaped corners. Each of the module locating pins mates with at least one of the inwardly-shaped corners. The mating of the module locating pins and the inwardly-shaped corners operates to precisely position the parallel optical transceiver modules relative to each other and relative to the mid-plane mounting structure.

The method is a method for positioning a plurality of parallel optical transceiver modules in an optical communications system. The method comprises providing a mid-plane mounting structure having a CB mounted on an upper surface thereof, providing an array of optical transceiver modules mounted on an upper mounting surface of the CB, and providing a plurality of module locating pins positioned at predetermined positions in the optical communications system. Each of the transceiver modules has at least one inwardly-shaped corner. Each inwardly-shaped corner has a shape that is generally complementary to a shape of a portion of the module locating pin. Each module locating pin has a shape that is generally complementary to the shape of the inwardly-shaped corners. The mating of the module locating pins and the inwardly-shaped corners operates to precisely position the parallel optical transceiver modules relative to each other and relative to the mid-plane mounting structure.

These and other features and advantages of the invention will become apparent from the following description, drawings and claims.

DETAILED DESCRIPTION OF AN ILLUSTRATIVE EMBODIMENT

In accordance with the invention, an optical communications system is provided in which module locating pins of the system mate with shaped corners formed on parallel optical transceiver modules of the system when the parallel optical transceiver modules are mounted on a mid-plane mounting structure of the system. The shaped corners of the parallel optical transceiver modules are complementary in shape to portions of the module locating pins, and therefore are inwardly shaped in a manner that depends on the shape of the module locating pins. The mating of the module locating pins with the inwardly-shaped corners of the modules operates to passively position the modules at intended spatial locations relative to each other and relative to the mid-plane mounting structure. The inwardly-shaped corners of the parallel optical transceiver modules consume very little space in the modules themselves. Likewise, the module locating pins consume very little space in the optical communications system. Consequently, the pitch between adjacent parallel optical transceiver modules can be kept very small and the mounting density of the modules on the mid-plane mounting structure can be very high. To demonstrate the principles and concepts of the invention, a few illustrative, or exemplary, embodiments will now be described with reference to the figures.

Figure 1:
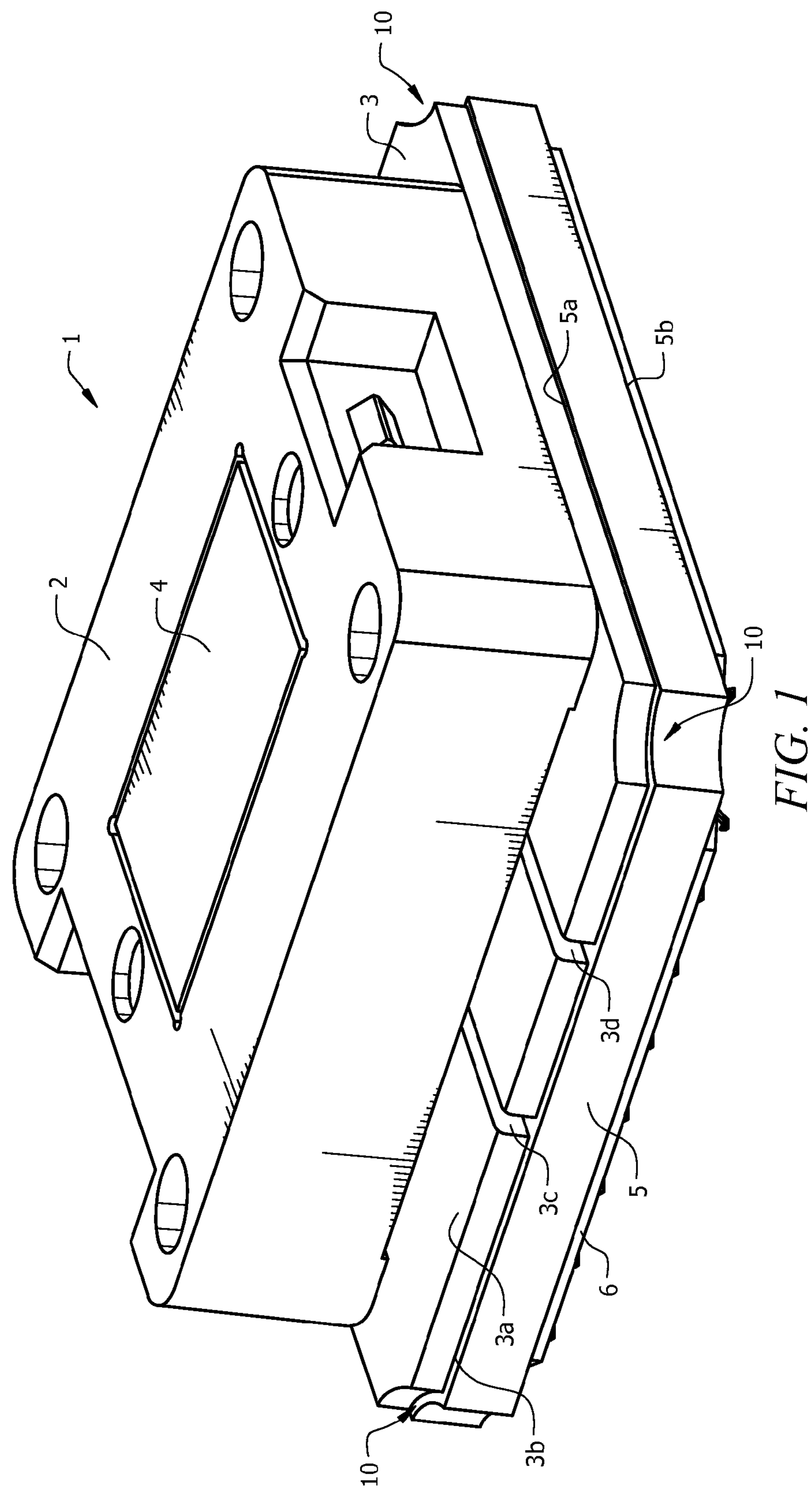
FIG. 1 illustrates a top perspective view of a parallel optical transceiver module that has inwardly-shaped corners and that is configured to be mounted in a mid-plane mounting configuration with locating pins that mate with the shaped corners.

FIG. 1 illustrates a top perspective view of a parallel optical transceiver module 1 that is configured to be mounted in a mid-plane mounting configuration. The invention is not limited to any particular type or configuration of the parallel optical transceiver module. The module 1 shown in FIG. 1 is one example of a parallel optical transceiver module that has a configuration that is suitable for use with the invention. In accordance with this illustrative embodiment of FIG. 1, the module 1 is a twelve-channel transceiver module. The invention, however, is not limited with respect to the number of channels that are within the module. Also, the term "transceiver module", as that term is used herein, is intended to denote any of the following: (1) an optical TX that has transmit channels, but no receive channels; (2) an optical RX that has receive channels, but no transmit channels; and (3) an optical transceiver that has one or more transmit channels and one or more receive channels.

An optics holder 2 of the module 1 is secured to a leadframe 3 of the module 1. The optics holder 2 has an optics system 4 secured thereto. The leadframe 3 has an upper surface 3*a* and a lower surface 3*b*. As will be described below in more detail with reference to FIG. 2, the leadframe 3 is split to provide air gaps 3*c* and 3*d* in the leadframe 3. The air gap 3*c* is located between a photodiode array (not shown) and a receiver integrated circuit (IC) (not shown). The air gap 3*d* is located between a laser diode array (not shown) and a laser diode driver IC (not shown). The air gaps 3*c* and 3*d* thermally isolate the photodiode and laser diode arrays from their respective ICs, and thus help prevent heat generated by the ICs from adversely affecting the performance of the laser diodes and photodiodes.

The parallel optical transceiver module 1 includes a printed circuit board (PCB) 5 having an upper surface 5*a* and a lower surface 5*b*. The lower surface 5*b* has a land grid array (LGA) 6 integrally formed thereon. The lower surface 3*b* of the leadframe 3 is attached to the upper surface 5*a* of the PCB 5. The module 1 has inwardly-shaped corners 10 that, as stated above, are shaped to mate with module locating pins, as will be described below with reference to FIGS. 4-6. The inwardly-shaped corners 10 are formed by removing or eliminating predetermined portions of each respective corner of the leadframe 3 and of the PCB 5. In accordance with the illustrative embodiment of FIG. 1, each inwardly-shaped corner 10 is concave in shape. Each concave corner 10 has a shape that is the complement of an outer portion of a cylinder. It should be noted, however, that the inwardly-shaped corners 10 may have other shapes, as will be described below in more detail.

Figure 2:
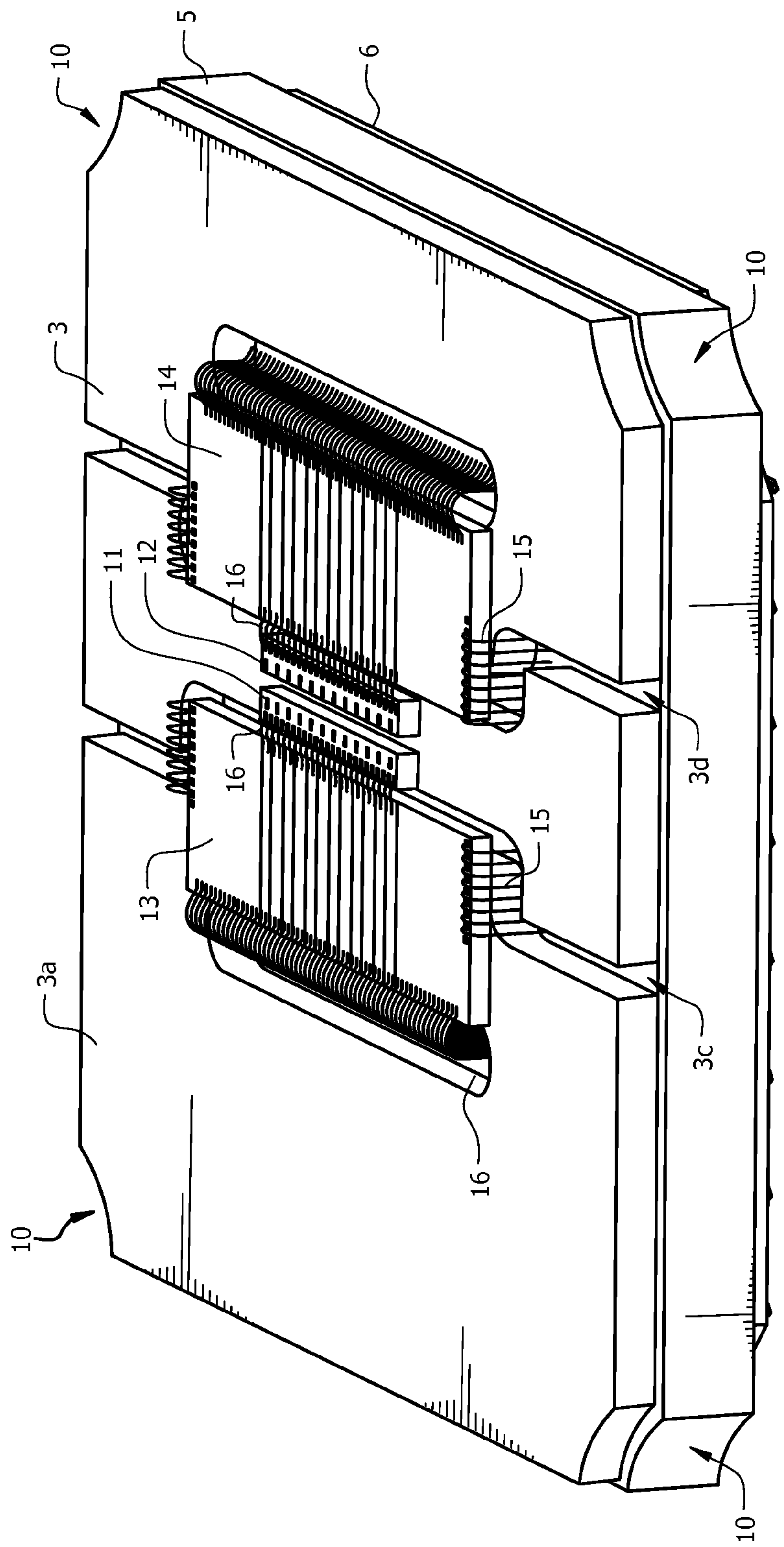
FIG. 2 illustrates a top perspective view of the leadframe and of the PCB of the parallel optical transceiver module shown in FIG. 1 with the optics holder removed to show a photodiode array, a laser diode array, a receiver IC, and a laser diode driver IC mounted on the leadframe.
Figure 3:
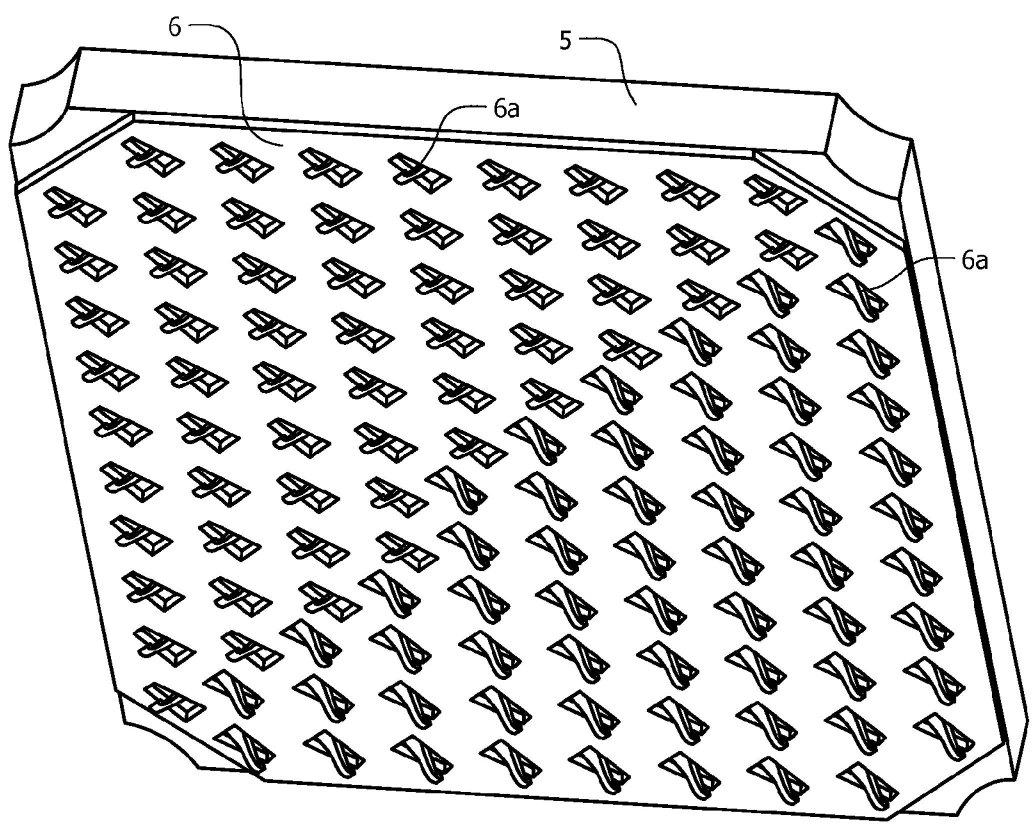
FIG. 3 illustrates a bottom perspective view of the PCB and LGA of the parallel optical transceiver module shown in FIGS. 1 and 2.

FIG. 2 illustrates a top perspective view of the parallel optical transceiver module 1 shown in FIG. 1 with the optics holder 2 of the module 1 removed. FIG. 3 illustrates a bottom perspective view of the PCB 5 and LGA 6. Referring again to FIG. 2, on the upper surface 3*a* of the leadframe 3, the following components are mounted: a photodiode array 11, a laser diode array 12, a receiver IC 13, and a laser diode driver IC 14. The air gaps 3*c* and 3*d* formed in the leadframe 3 thermally isolate the photodiode array 11 and the laser diode array 12 from the receiver IC 13 and the laser diode driver IC 14, respectively. The laser diode array 12 is an array of twelve vertical cavity surface emitting laser diodes (VCSELs). The photodiode array 11 is an array of twelve P-I-N diodes. Thus, in accordance with this embodiment, the parallel optical transceiver module 1 (FIG. 1) has twelve transmit channels and twelve receive channels.

Bond wires 15 electrically connect the ICs 13 and 14 to electrical contacts (not shown) disposed on the PCB 5, which, in turn, are electrically connected to the LGA 6. Electrical contacts 6*a* of the LGA 6 come into contact with respective electrical contacts (not shown) disposed in an upper surface of a motherboard PCB (not shown) when the module 1 is mounted on the mounting substrate (not shown) of the optical communications system, as will now be described with reference to FIG. 4. Bond wires 16 electrically connect electrical contacts on the arrays 11 and 12 to electrical contacts on the ICs 13 and 14, respectively.

Figure 4:
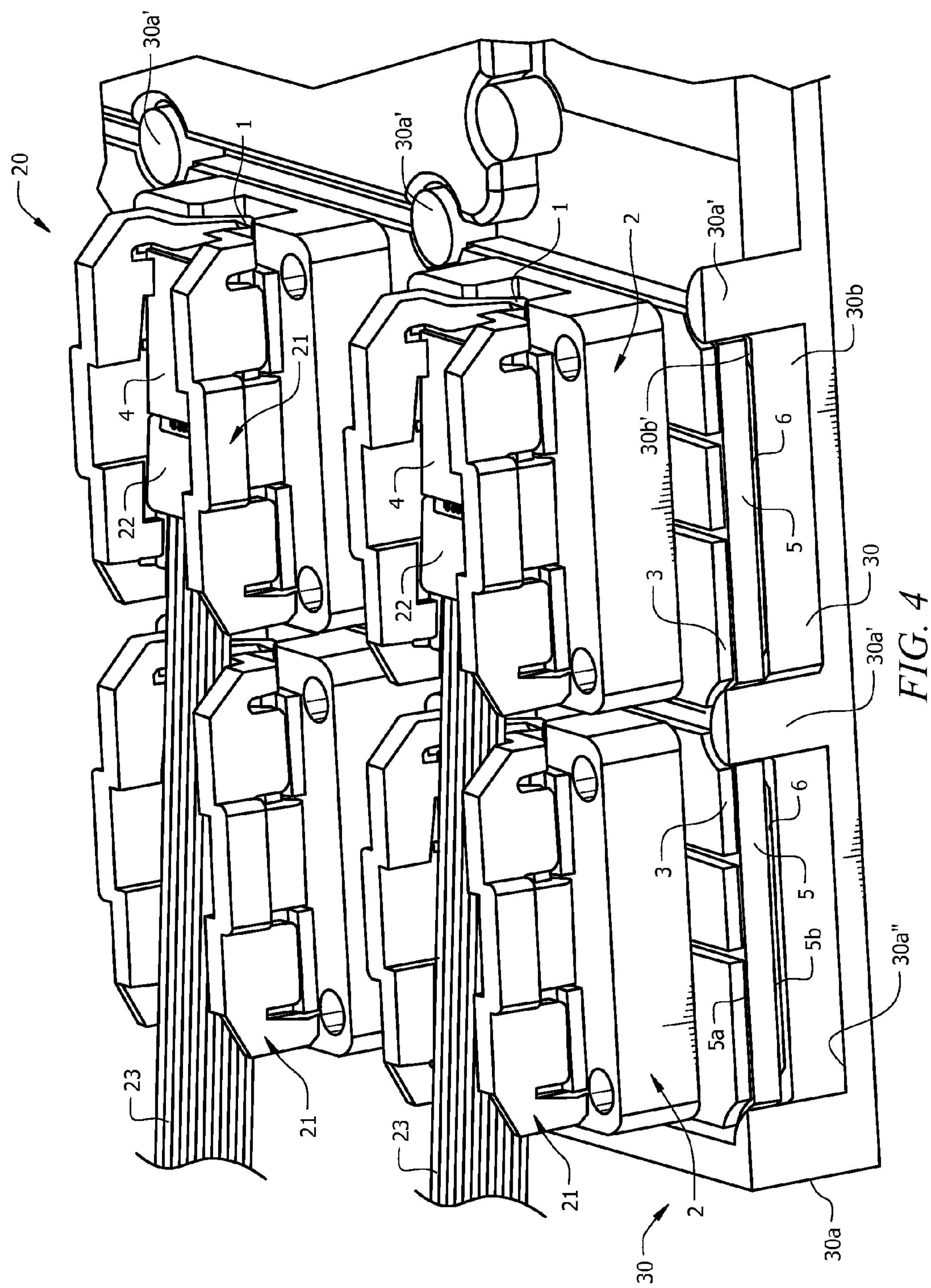
FIG. 4 illustrates a perspective side view of an optical communications system in accordance with an illustrative, or exemplary, embodiment, which comprises an array of the parallel optical transceiver modules shown in FIG. 1 mid-plane mounted on a mid-plane mounting structure.

FIG. 4 illustrates a perspective side view of an optical communications system 20 in accordance with an illustrative, or exemplary, embodiment, which comprises an array of the parallel optical transceiver modules 1 shown in FIG. 1 mid-plane mounted on a mid-plane mounting structure 30. Like numerals in FIGS. 2, 3 and 4 represent like components. A snap cover 21 is mechanically coupled to each of the optics holders 2 of each of the parallel optical transceiver modules 1. A connector 22 that terminates an end of an optical fiber ribbon cable 23 is secured to the optics system 4 of each of the modules. Each ribbon cable 23 has twelve fibers. The optics system 4 couples light between the ends (not shown) of respective ones of the optical fibers of the ribbon cable 23 and respective ones of either the laser diodes or photodiodes of the arrays 11 or 12.

The mid-plane mounting structure 30 includes a molded plastic frame 30*a* and a motherboard PCB 30*b*. The motherboard PCB 30*b* is mounted on an upper surface 30*a*" of the plastic frame 30*a* such that a lower surface 30*b*" of the motherboard PCB 30*b* is in contact with the upper surface 30*a*" of the plastic frame 30*a*. The upper surface 30*b*' of the motherboard PCB 30*b* is in contact with and is electrically interconnected with the LGA 6. The plastic frame 30*a* has module locating pins 30*a*' integrally formed therein or secured thereto. The module locating pins 30*a*' protrude from the frame 30*a* in a direction that is generally upwards towards the modules 1 and normal to a plane defined by the upper surface 30*a*" of the plastic frame 30*a*.

In accordance with this embodiment, the module locating pins 30*a*' are generally cylindrical in shape and are generally complementary in shape to the shapes of the concave corners 10 formed in the parallel optical transceiver modules 1. The module locating pins 30*a*' are positioned at constant spatial intervals over the upper surface 30*a*" of the frame 30*a* and are positioned such that each module locating pin 30*a*' mates with a respective inwardly-shaped corner 10 of at least one of the modules 1. At locations on the frame 30*a* where a given module locating pin 30*a*' is surrounded by two or more of the modules 1, the module locating pin 30*a*' mates with the inwardly-shaped corners 10 of each of the surrounding modules 1.

Figure 5:
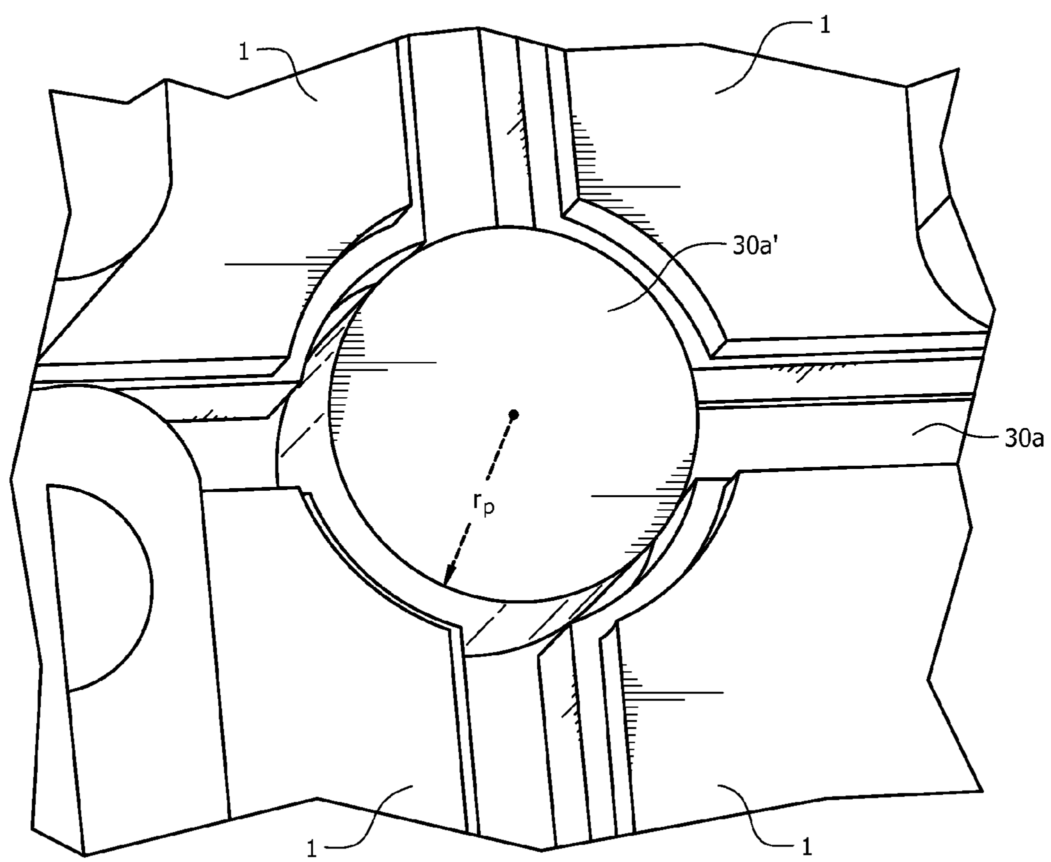
FIG. 5 illustrates an enlarged top perspective view of a portion of the optical communications system shown in FIG. 4, which demonstrates the manner in which the shaped corners of the multiple adjacent parallel optical transceiver modules mate with the module locating pin that they surround.
Figure 6:
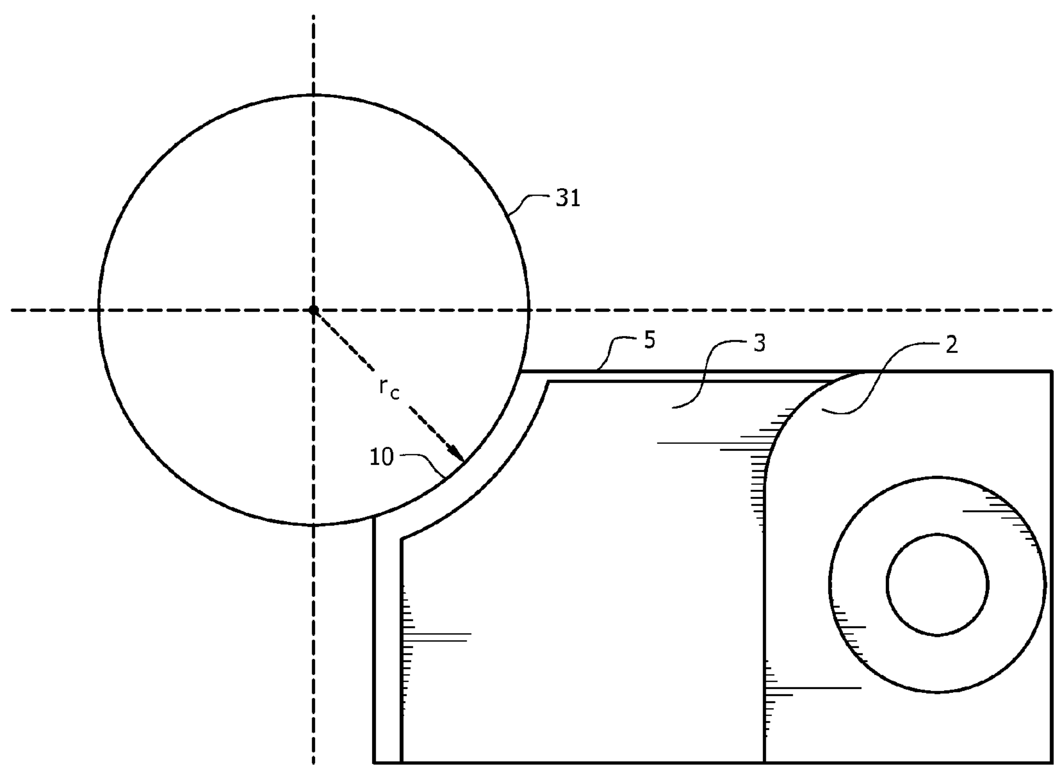
FIG. 6 illustrates an enlarged top plan view of a corner portion of one of the parallel optical transceiver modules 1 shown in FIG. 4.

FIG. 5 illustrates an enlarged top perspective view of a portion of the optical communications system 20 shown in FIG. 4, which demonstrates the manner in which the inwardly-shaped corners 10 of multiple adjacent parallel optical transceiver modules 1 mate with the module locating pin 30*a*' that the modules 1 surround. FIG. 6 illustrates an enlarged top plan view of a corner portion of one of the parallel optical transceiver modules 1 shown in FIG. 1. The interaction of the module locating pins 30*a*' with the inwardly-shaped corners 10 will be described with reference to FIGS. 5 and 6. The radius, $r_p$, of the module locating pin 30*a*' is smaller than the radius, $r_c$, of the arc of the imaginary circular 31 that defines the inwardly-shaped corners 10, which, in accordance with this embodiment, are concave. Consequently, the module locating pin 30*a*' will only come into contact with each corner 10 at one respective predetermined point on the corner 10. This feature ensures that the module locating pins 30*a*' will operate to passively position the modules 1 at precise locations on the upper surface 30*a*" of the frame 30*a*. If the radius $r_p$ of the module locating pins 30*a*' is made equal to or greater than the radius $r_c$ of the corners 10, then more than one point of each of the corners 10 would be in contact with the module locating pin 30*a*'. The latter case would result in uncertainty as to which contact point is controlling the location of the module 1, which would be undesirable in cases in which very precise positioning of the modules 1 is needed or required. In the example shown in FIGS. 5 and 6, $r_p$=0.039 inches (0.991 millimeters (mm)) and $r_c$=0.042 inches (1.066 mm). It should be noted that the invention is not limited to any particular dimensions for the corners 10 or for the module locating pins 30*a*'.

It should also be noted that the invention is not limited to the module locating pins 30*a*' being cylindrical in shape or the corners 10 having a shape that is complementary to the shape of a cylinder. For example, the module locating pins could be square in shape and the corners could have shapes that are complementary to the shape of the square pin. For this reason, the term "module locating pins" is used herein to denote locating pins having any suitable shape, and the term "inwardly-shaped corners" is used herein to denote corners that have shapes that are complementary to the shape of the module locating pins. Square module locating pins and corners, however, are more difficult to manufacture with high precision than the cylindrical shapes shown in FIGS. 2 and 3. In addition, the precision of the mating configurations of the corners 10 and module locating pins 30*a*' shown in FIGS. 4 and 5 could be further improved by using springs (not shown) to bias the corners 10 and module locating pins 30*a*' against one another. The manner in which springs may be used in this manner to provide even higher precision will be understood by persons of ordinary skill in the art in view of the description provided herein.

Figure 7A:
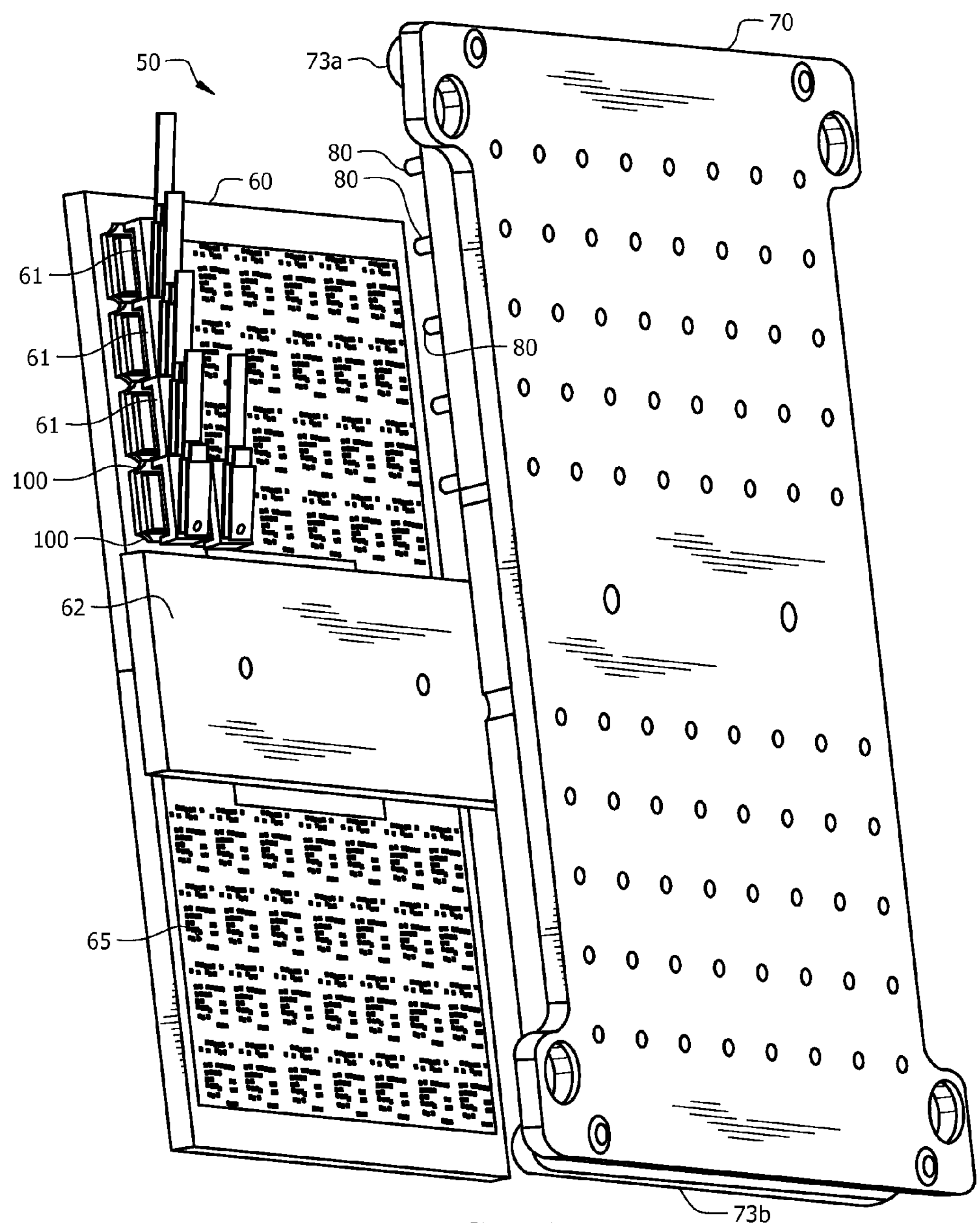
FIGS. 7A and 7B illustrate top and bottom perspective views, respectively, of an optical communications system in accordance with another illustrative embodiment in which module locating pins mate with concave corners formed on parallel optical transceiver modules to position the modules at precise locations in a mid-plane mounting arrangement.
Figure 7B:
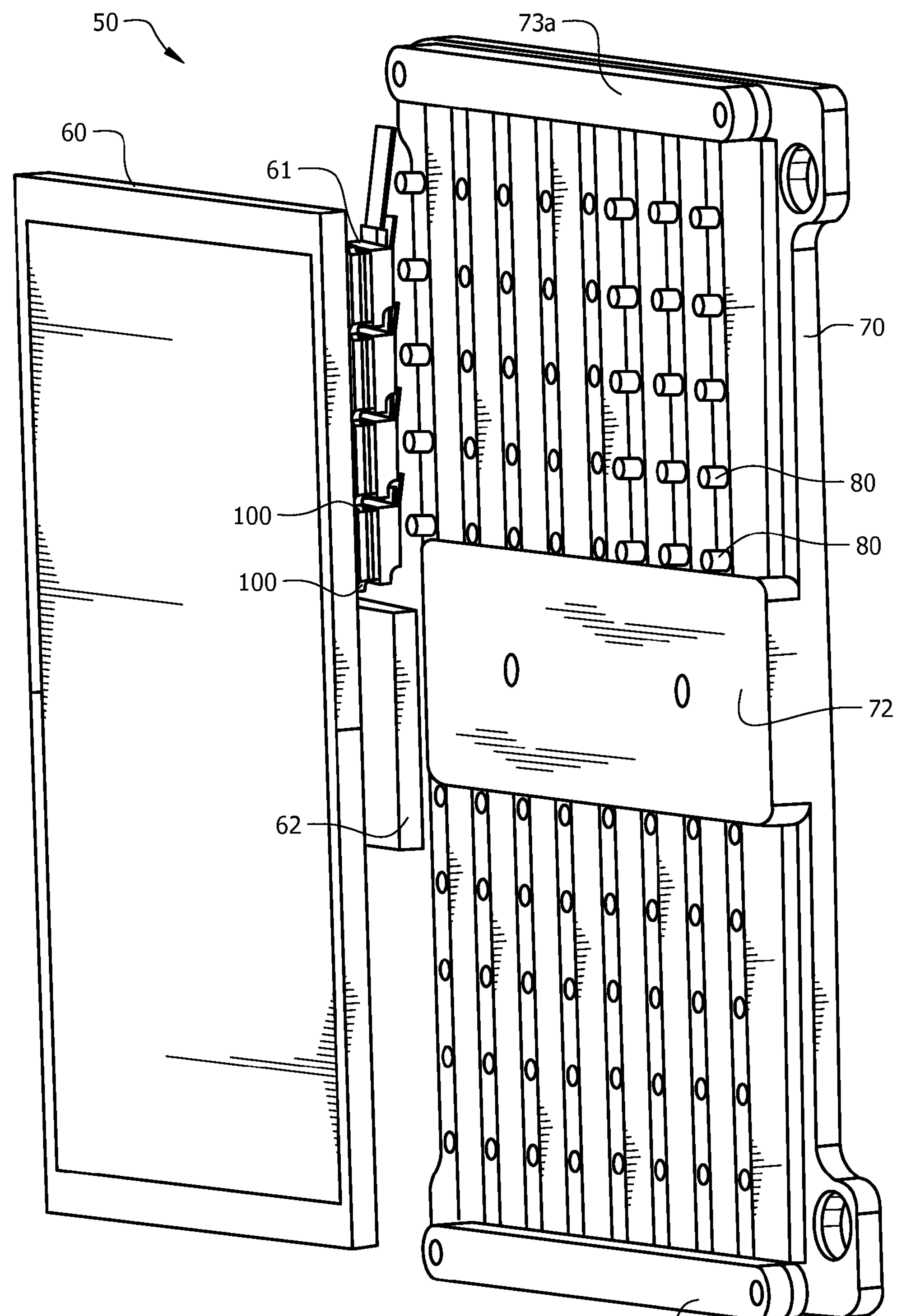

FIGS. 7A and 7B illustrate top and bottom perspective views, respectively, of an optical communications system 50 in accordance with another illustrative embodiment in which module locating pins mate with concave corners formed on parallel optical transceiver modules 61 to position the modules 61 at precise locations in a mid-plane mounting arrangement. While the modules 61 are different in many respects from the modules 1 shown in FIG. 1, the modules 61 include concave corners 100, which may be similar or identical to the concave corners 10 shown in FIG. 1. The optical communications system 50 includes a mid-plane mounting structure 60 on which a plurality of the parallel optical transceiver modules 61 are mounted. A heat sink device 62 of the system 50 has a top hat configuration that covers and is in contact with ICs (not shown) that are mounted on the mid-plane mounting structure 60. The mid-plane mounting structure 60 comprises a PCB 65. The heat sink device 62 operates to dissipate heat that is generated by the ICs (not shown). An external heat sink device 70 is configured to be secured to the mid-plane mounting structure 60 such that a portion 72 of the external heat sink device 70 is in contact with the heat sink device 62 of the system 50. The external heat sink device 70 removes heat from the heat sink device 62 of the system 50.

In addition, in accordance with this embodiment, the external heat sink device 70 has cylindrically-shaped module locating pins 80 located thereon. The module locating pins 80 are spaced apart from one another by a predetermined constant spacing amount, which is preselected to control the alignment and positioning of the parallel optical transceiver modules 61 relative to each other and relative to the plane defined by the mid-plane mounting structure 60. The external heat sink device 70 is secured to the mid-plane mounting structure 60 via fasteners 73*a* and 73*b*. When the external heat sink device 70 is secured to the mid-plane mounting structure 60, the module locating pins 80 are in contact with the concave corners 10 of the modules 61, thereby providing a mounting configuration that is identical or very similar to the mounting configuration shown in FIG. 5.

The primary difference between the embodiment shown in FIGS. 4 and 5 and the embodiment shown in FIGS. 7A and 7B is that the module locating pins 30*a*' shown in FIGS. 4 and 5 are integrally formed on the plastic frame 30*a* shown in FIGS. 4 and 5 whereas the module locating pins 80 shown in FIGS. 7A and 7B are secured to, or integrally formed in, the external heat sink device 70 shown in FIGS. 7A and 7B. In both embodiments, the module locating pins and the concave corners mate with each other in a way that ensures that the modules are positioned with very high precision at preselected locations in the plane defined by the mid-plane mounting structures 30 (FIG. 4) and 60 (FIGS. 7A and 7B).

It should be noted that the invention has been described with respect to illustrative embodiments for the purpose of describing the principles and concepts of the invention. The invention is not limited to these embodiments. For example, while the invention has been described with reference to using particular configurations for the inwardly-shaped corners and module locating pins, the invention is not limited to these mating configurations. Also, while each of the parallel optical transceiver modules shown in FIGS. 1-6B have four concave corners, each transceiver module may have as few as one or two concave corners. However, increasing the number of corners on each module that are made concave in shape to mate with the module locating pins generally increases precision with which the modules are located in the mid-plane mounting configuration. Of course, the invention is not limited with respect to the configuration of the parallel optical transceiver modules. As will be understood by those skilled in the art in view of the description being provided herein, modifications may be made to these configurations and to other aspects of the embodiments described herein while yet achieving the goals of the invention. As will be understood by persons of ordinary skill in the art, in view of the description provided herein, all such modifications are within the scope of the invention.

What is claimed is:

1. An optical communications system comprising:

a mid-plane mounting structure having a circuit board (CB) mounted on an upper surface thereof;

an array of parallel optical transceiver modules mounted on an upper mounting surface of the CB, each of the transceiver modules having at least one inwardly-shaped corner, wherein each inwardly-shaped corner has a shape that is generally complementary to a shape of a portion of a module locating pin;

a plurality of module locating pins positioned at predetermined positions in the optical communications system, each module locating pin having a shape that is generally complementary to the shape of the inwardly-shaped corners, each of the module locating pins mating with at least one of the inwardly-shaped corners, wherein the mating of the module locating pins and the inwardly-shaped corners operates to precisely position the parallel optical transceiver modules relative to each other and relative to the mid-plane mounting structure; and an external heat sink device secured to the mid-plane mounting structure such that an upper surface of the external heat sink device generally faces the upper mounting surface of the CB, wherein the module locating pins have first ends that are integrally formed in or secured to an upper surface of the external heat sink device, and wherein the module locating pins have second ends that extend away from the upper surface of the heat sink device in a direction generally normal to the upper surface of the heat sink device and toward the upper mounting surface of the CB, and wherein at least one of the module locating pins mates with one of the inwardly-shaped corners of at least two of the parallel optical transceiver modules.

2. The optical communications system of claim 1, wherein the module locating pins are generally cylindrical in shape and the inwardly-shaped corners are concave in shape and complementary to the generally cylindrical shape of the module locating pins.

3. The optical communications system of claim 1, wherein the module locating pins are non-cylindrical in shape and the inwardly-shaped corners have a shape that is complementary to the non-cylindrical shape of the module locating pins.

4. The optical communications system of claim 1, wherein the mid-plane mounting structure comprises a molded plastic frame, and wherein the CB is mounted on an upper surface of the frame, and wherein the plurality of module locating pins have first ends that are integrally formed in or secured to the upper surface of the frame, and wherein the plurality of module locating pins have second ends that extend away from the upper surface of the frame in a direction generally normal to the upper surface of the frame, and wherein the second ends of the module locating pins pass through the CB and extend in a direction away from the CB and generally normal to the upper mounting surface of the CB, and wherein at least one of the module locating pins mates with one of the inwardly-shaped corners of at least two of the parallel optical transceiver modules.

5. The optical communications system of claim 4, wherein a first one of the module locating pins mates with one of the inwardly-shaped corners of at least two of the parallel optical transceiver modules, and wherein a second one of the module locating pins mates with one of the inwardly-shaped corners of at least two of the parallel optical transceiver modules.

6. The optical communications system of claim 5, wherein a first one of the module locating pins mates with one of the inwardly-shaped corners of at least four of the parallel optical transceiver modules, and wherein a second one of the module locating pins mates with one of the inwardly-shaped corners of at least four of the parallel optical transceiver modules.

7. The optical communications system of claim 1, wherein each parallel optical transceiver module includes at least six transmit channels and at least six receive channels.

8. The optical communications system of claim 1, wherein a first one of the module locating pins mates with one of the inwardly-shaped corners of at least two of the parallel optical transceiver modules, and wherein a second one of the module locating pins mates with one of the inwardly-shaped corners of at least two of the parallel optical transceiver modules.

9. The optical communications system of claim 8, wherein a first one of the module locating pins mates with one of the inwardly-shaped corners of at least four of the parallel optical transceiver modules, and wherein a second one of the module locating pins mates with one of the inwardly-shaped corners of at least four of the parallel optical transceiver modules.

10. The optical communications system of claim 1, wherein each parallel optical transceiver module includes at least six transmit channels and at least six receive channels.

11. A method for positioning a plurality of parallel optical transceiver modules in an optical communications system, the method comprising:

providing a mid-plane mounting structure having a circuit board (CB) mounted on an upper surface thereof;

providing an array of parallel optical transceiver modules mounted on an upper mounting surface of the CB, each of the transceiver modules having at least one inwardly-shaped corner, wherein each shaped corner has a shape that is generally complementary to a shape of a portion of a module locating pin;

providing a plurality of module locating pins positioned at predetermined positions in the optical communications system, each module locating pin having a shape that is generally complementary to the shape of the shaped corners, each of the module locating pins mating with at least one of the shaped corners, wherein the mating of the module locating pins and the shaped corners operates to precisely position the parallel optical transceiver modules relative to each other and relative to the mid-plane mounting structure; and providing an external heat sink device secured to the raid-plane mounting, structure such that an upper surface of the external heat sink device generally faces the upper mounting surface of the CB, wherein the module locating pins have first ends that are integrally formed in or secured to an upper surface of the external heat sink device, and wherein the module locating pins have second ends that extend away from the upper surface of the heat sink device in a direction generally normal to the upper surface of the heat sink device and toward the upper mounting surface of the CB, and wherein at least one of the module locating pins mates with one of the inwardly-shaped corners of at least two of the parallel optical transceiver modules.

12. The method of claim 11, wherein the module locating pins are generally cylindrical in shape and the inwardly-shaped corners are concave in shape and complementary to the generally cylindrical shape of the module locating pins.

13. The method of claim 11, wherein the module locating pins are non-cylindrical in shape and the inwardly-shaped corners have a shape that is complementary to the non-cylindrical shape of the module locating pins.

14. The method of claim 11, wherein the mid-plane mounting structure comprises a molded plastic frame, and wherein the CB is mounted on an upper surface of the frame, and wherein the plurality of module locating pins have first ends that are integrally formed in or secured to the upper surface of the frame, and wherein the plurality of module locating pins have second ends that extend away from the upper surface of the frame in a direction generally normal to the upper surface of the frame, and wherein the second ends of the module locating pins pass through the CB and extend in a direction away from the CB and generally normal to the upper mounting surface of the CB, and wherein at least one of the module locating pins mates with one of the inwardly-shaped corners of at least two of the parallel optical transceiver modules.

15. The method of claim 14, wherein a first one of the module locating pins mates with one of the inwardly-shaped corners of at least two of the parallel optical transceiver modules, and wherein a second one of the module locating pins mates with one of the inwardly-shaped corners of at least two of the parallel optical transceiver modules.

16. The method of claim 15, wherein a first one of the module locating pins mates with one of the inwardly-shaped corners of at least four of the parallel optical transceiver modules, and wherein a second one of the module locating pins mates with one of the inwardly-shaped corners of at least four of the parallel optical transceiver modules.

17. The method of claim 11, wherein each parallel optical transceiver module includes at least six transmit channels and at least six receive channels.

18. The method of claim 11, wherein a first one of the module locating pins mates with one of the inwardly-shaped corners of at least two of the parallel optical transceiver modules, and wherein a second one of the module locating pins mates with one of the inwardly-shaped corners of at least two of the parallel optical transceiver modules.

19. The method of claim 18, wherein a first one of the module locating pins mates with one of the inwardly-shaped corners of at least four of the parallel optical transceiver modules, and wherein a second one of the module locating pins mates with one of the inwardly-shaped corners of at least four of the parallel optical transceiver modules.

* * * * *